United States Patent [19]

Anderson

[11] 3,854,245
[45] Dec. 17, 1974

[54] BUILDING STRUCTURE
[75] Inventor: Richard N. Anderson, Owensboro, Ky.
[73] Assignee: V. E. Anderson, Mfg. Co., Owensboro, Ky.
[22] Filed: Jan. 20, 1972
[21] Appl. No.: 219,330

[52] U.S. Cl. ...................... 49/449, 49/425, 49/504, 52/758 H, 403/294, 403/401
[51] Int. Cl. ............................................ E05d 13/04
[58] Field of Search ............ 49/420, 425, 504, 505; 52/507, 400, 656, 758 H, 753 D, 753 C; 403/169–178, 294, 295, 401

[56] References Cited
UNITED STATES PATENTS

| | | | |
|---|---|---|---|
| 2,627,092 | 2/1953 | Grossman | 49/425 X |
| 2,788,097 | 4/1957 | Frick | 49/425 X |
| 3,214,873 | 11/1965 | Davis | 52/400 X |
| 3,393,471 | 7/1968 | Skowlund et al. | 49/504 X |

Primary Examiner—Kenneth Downey
Attorney, Agent, or Firm—Whittemore, Hulbert & Belknap

[57] ABSTRACT

Sliding door structure including an outer frame, at least one fixed and one movable door panel, said frame including a head having a single inwardly extending door panel guiding fin for guiding only the movable door panel in movement in the plane of the frame and no fin between the fixed and movable door panels. Said frame also including all mitered corners. Improved weather stripping at both the top and bottom rail of both the fixed and movable door panels, fixed door panel side rail staked-out structure for releasably securing a fixed door panel side rail to the frame and a fixed panel weather stop are also provided. Resilient bumpers are provided for the movable door panel along with a weather stop and prowler security member at the upper mitered corners of the outer frame, weather stops at the lower mitered corners of the frame and unique two-member glazing structure capable of resisting high wind force and permitting glazing of the door panels from the inside. Prowler lock structure permitting locking of the movable panel of the sliding door structure in a number of selected positions is also provided. The sliding door further includes bottom adjusting structure for the movable door panel including a separate expander having a weather strip extending from the side thereof, which expander is inserted in the bottom rail of the movable door panel and an adjustable wedge in the expander operable in conjunction with a wedge block on the movable door panel to pivot the movable door panel about a point on the bottom rail to adjust it to out-of-square frames. There is also disclosed in conjunction with the sliding door of the invention a nail fin adapter for the door frame members, both inside and outside trim structure and an adapter for extending the frame sill.

10 Claims, 24 Drawing Figures

BUILDING STRUCTURE

BACKGROUND OF THE INVENTION

1. Field of the Invention

The invention relates to building structures and refers more specifically to a sliding door which is aesthetically pleasing, easily operated, has weathertight integrity to both air and water, has extremely high structural integrity and substantial universality of components whereby the greatest degree of versatility has been achieved from a specified inventory investment of raw material and finished goods at a relatively low cost.

2. Description of the Prior Art

In the past, sliding doors have not generally included all-mitered corners. In particular, the jambs at the bottoms of previous sliding doors have generally been either straight-cut across the sill, or where the sill has been inclined, the jambs have been cut diagonally. Thus, a high degree of orientation is given to the frame members of previous sliding doors which is undesirable from an inventory and thus cost point of view.

In addition, in prior sliding doors, either two pockets formed by three fins, one pocket for each of a movable and a fixed door panel, with a fin between the door panels, have been provided in the frame head, or alternatively, three pockets have been provided between two outer fins and two intermediate or guide fins in the frame head for guiding the top rails of a movable and a fixed door panel with the guide fins received in slots in the door panel top rails. In both structures considerable weather sealing and/or fabrication of weather seal interlocks on the door panels has been necessary. Again, the added weather sealing and fabrication together with the orientation which the fabrication and/or weather sealing required has given the components of and the finished door panels thus constructed has added an undesirable cost factor and inventory requirement to previous sliding doors.

Further, previous sliding doors have usually not been suitably weathertight without expensive and sometimes complicated structure. Thus, for example, a complete aluminum surround has often been provided in the past for glazing sliding door panels from the inside to prevent popping of the glazing panels out of the frame therefor under high wind loads. Complicated structure has sometimes been required to prevent entire sliding door panels from being blown out of the outer frame therefor.

In addition, with prior sliding doors, stopping of the sliding door on opening has sometimes been a problem. Wherein stops are provided only at the tops or bottoms of the movable door panel, the door panel tends to cock in the frame on hitting the stop, thus wearing door panel rollers and/or damaging the outer frame or movable door panel. Prior stop structures have in addition often required separate fabrication of the frame members to install and have sometimes themselves been complicated and therefore expensive. Central stops have in general not been utilized due to their appearance and the fact that they tend to damage the door and/or frame members due to single point contact therewith centrally thereof.

Further, with prior sliding doors it has often been possible on jiggling the movable door panel to unlock it and gain entrance into the building in which the doors have been installed. Further, it has generally been impossible with sliding doors to lock the movable door panel in a partially open position to provide, for example, ventilation without allowing small children to go out or prowlers to come in the doors.

Also, it is difficult in the field with the size of sliding doors usually installed today to obtain square structural openings for the sliding door structures. It has, therefore, been necessary to adjust the movable door panel of sliding doors to compensate for the out-of-square door openings. In the past, such adjustment has usually been accomplished by adjusting the movable door panel at both sides thereof which requires separate adjusting mechanisms and separate adjustments which are not entirely independent at both sides of the movable door panels.

Further, in the past sliding doors have not always been adapted for installation in a wide variety of building structures with a single frame as, for example, building structures that require nailing fins for securing the frame to the exterior of the building structure. In addition, neither interior nor exterior trim for sliding doors have normally been readily available and extensions of sliding door frame sills have in the past generally been field fabricated.

SUMMARY OF THE INVENTION

In accordance with the present invention, there is provided a sliding door including an outer frame having four mitered corners and a plurality of door panels, at least one of which may be fixed and one of which is movable, which outer frame and door panels and the individual members thereof have been constructed with a minimum of orientation to provide the greatest degree of versatility from a specified inventory investment for both raw and finished goods possible. Thus, wherever possible, the members of the sliding door structure of the invention are interchangeable right-/left, up/down, inside and outside.

In particular, the head of the outer frame of the sliding door structure disclosed is provided with a single guide fin for guiding a movable door panel, and no fin is positioned between the movable door panel and the fixed door panel whereby weather sealing of the door panels is particularly simple and efficient. Unique weather seals are provided at both the upper and lower rails of both the movable and fixed panels of the sliding door structure, some of which also aid in maintaining the structural integrity of the sliding door, in accordance with the invention.

Further, the fixed door panel of the sliding door structure of the invention is retained at its fixed side rail in assembly with a jamb of the outer frame by staked-out portions therein. The other or free side rail of the fixed door panel of the sliding door structure may be secured to the sill by a weather stop bracket to enable the sliding door structure to withstand very high winds. Further, a two-member glazing system is provided for the door panels in accordance with the invention to enable the glazing panels to withstand very high wind pressures, which glazing system is extremely economical in comparison to existing high wind pressure glazing systems.

A unique bumper system is provided for the sliding door structure including a resilient bumper at both the top and bottom of the movable door panel which require no fabrication of the sliding door structure. In addition, prowler security means are provided at the upper corners of the sliding door structure which prevents upward jiggling of the movable panel and consequent unauthorized unlocking thereof along with weather stops at all four mitered corners of the sliding doors, which weather stops also serve to align the mitered corners in field assembly. Separate prowler lock structure and modifications thereof are also provided to permit locking of the movable panel of the sliding door structure in any of a plurality of closed and partly open positions.

To compensate for out-of-square door openings in installation, the movable panel of the sliding door is positioned on an expander and a wedge and a wedge block are secured to the expander and to one edge of the movable panel of the sliding door structure respectively having engaged inclined plane surfaces for pivoting the movable panel to compensate for door frames that are out of square. The wedge is constructed to fit within the expander at two different levels to provide coarse movable panel adjustment. Fine adjustment of the panel is produced by relative movement of the wedge and wedge block. Wedge and wedge blocks may be provided at one or both edges of the movable door panel.

The sliding door structure is completed with a nailing fin adapter for securing the outer frame in building openings requiring nailing fins. Inside trim extrusions such as resilient bullnose sections adapted to accommodate flooring of different thickness and exterior trim members including members having a soft core and harder exterior skin are also provided for use in conjunction with the sliding door structure, along with a sill adapter for extending the width of the sill of the outer frame of the sliding door structure.

DESCRIPTION OF THE PREFERRED EMBODIMENT

Figure 1:
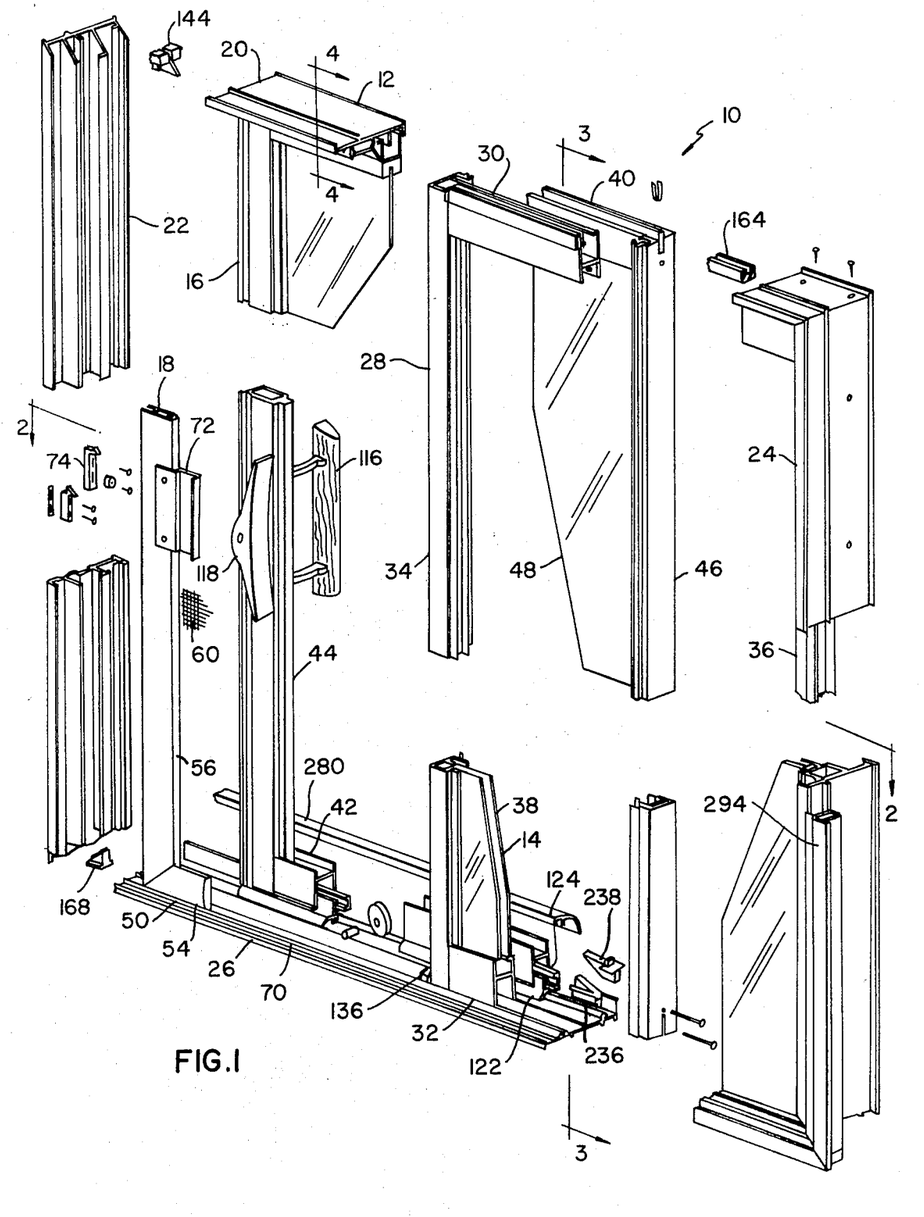
FIG. 1 is a partly broken away and exploded perspective view of sliding door structure constructed in accordance with the invention.

The sliding door structure 10 best shown in FIG. 1 includes an outer frame 12, a fixed door panel 14, a movable door panel 16 and a movable screen panel 18.

The sliding door structure 10 may have a plurality of fixed and/or moving door panels. Thus, the invention is not intended to be limited to sliding doors having a single fixed door panel and a single movable door panel.

Figure 2:
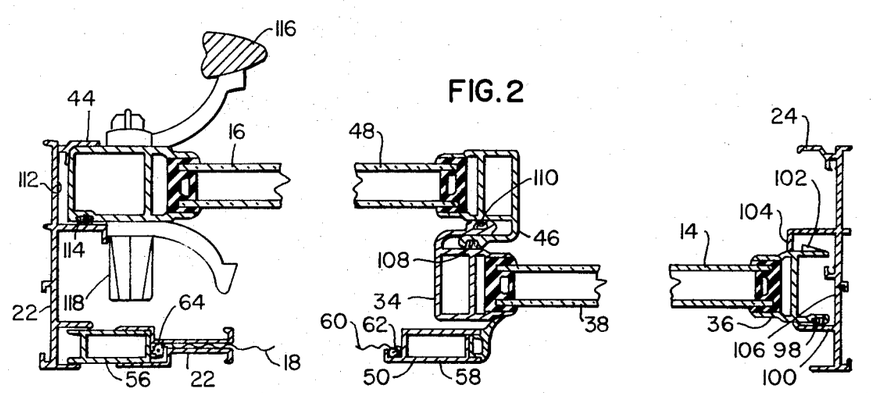
FIG. 2 is an enlarged, broken section view of the sliding door structure illustrated in FIG. 1, taken substantially on the line 2—2 in FIG. 1.
Figure 3:
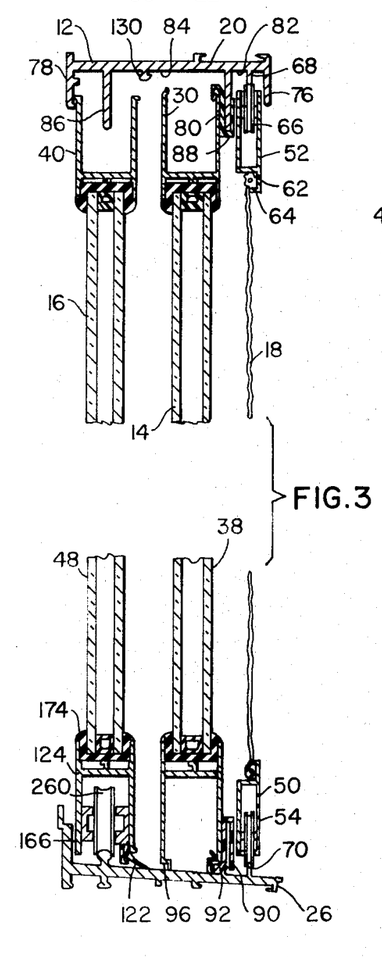
FIG. 3 is an enlarged, broken section view of the sliding door structure illustrated in FIG. 1, taken substantially on the line 3—3 in FIG. 1.

As shown, the outer frame 12 includes a head extrusion 20, jamb extrusions 22 and 24 at opposite sides of the sliding door structure 10 and a sill extrusion 26, which extrusions have the cross sections best shown in FIGS. 2 and 3. Each of the four corners of the outer frame 10 are mitered and may be held together by suitable screw means. With all four corners being mitered, the jambs are universal in that they have no left, right, up or down orientation.

The fixed door panel 14 includes a fixed door panel frame 28 having a top rail 30, a bottom rail 32 and free and fixed side rails 34 and 36 respectively, again having the cross section shown best in FIGS. 2 and 3. The side rails 34 and 36 extend the entire length of the fixed door panel as shown best in FIG. 1 and are secured to the top and bottom rails 30 and 32 at opposite ends thereof by suitable means such as screws or the like. A glazing panel 38 is secured in the fixed door panel frame 28. Each of the top, bottom and side rails of the fixed door panel 14 is also substantially universal in that they have as little orientation as possible so that the complete panel 14 as well as the individual members thereof may be used for different sliding door configurations.

The sliding door panel 16 includes a top rail 40, a bottom rail 42 and locking and free side rails 44 and 46, respectively. Also as before, the side rails 44 and 46 extend the full length of the movable door panel 16 and are connected to the top rail 40 and bottom rail 42 at the opposite ends thereof as shown best in FIG. 1. The glazing panel 48 is secured in the movable door panel 16 as before and all of the members of the movable panel 16 are constructed without particular orientation when possible so as to be interchangeable.

Thus, the sliding door structure 10 may be constructed in a great number of configurations with a minimum of separate parts such as frame jambs and panel rails and the like, and a complete inventory of sliding doors may be stocked, again with a minimum of separate sliding door elements such as exterior frames, fixed and moving panels. The cost of a sliding door inventory and production equipment and facilities is thus reduced.

The screen structure 18 includes the frame 50 having a top rail 52, a bottom rail 54 and side rails 56 and 58. A screen 60 is secured within the frame 50 by convenient means such as peripheral recess 62 in the rails having screen retaining members 64 positioned therein. Rollers 66 are mounted in the top and bottom screen frame rails and run on tracks 68 and 70 in the frame head 20 and sill 26 as shown. Suitable handle structure 72 and latch structure 74 are provided for moving the screen structure 18 in the plane of the frame 12 and retaining the screen in a closed position over the opening provided by the movable door panel 16, respectively. The screen structure 18, handle structure 72 and latch structure 74 are known articles of commerce which may be purchased from a plurality of sources and will not therefore be considered in further detail herein.

The head 20 of the door frame 12 has a cross section shown best in FIG. 3 which includes an outer fin 76 and an inner fin 78 which are only outside and inside trim in the door structure 10. A fin 80 which is a seal for the fixed door panel 14 is positioned between the outer fin 76 and the inner fin 78 and separates the pocket 82 in which the screen panel 18 is received and the pocket 84 in which the top rails 30 and 40 of the fixed door panel 14 and the movable door panel 16 are positioned. A guiding fin 86 is further provided in the pocket 84 for guiding the movable door panel 16 within the frame 12.

Since the head 20 does not include a separate fin positioned between the top rails 30 and 40 of the fixed and movable door panels, no special fabrication of the interlocking portions of free side rails 34 and 36 is required and removable interlocking portions to facilitate universal orientation of the free side rails is not required. Similarly, since only the movable door panel 16 is provided with a guiding fin 86, special weather stripping to prevent the passage of wind and water through the door structure 10 between the head 20 and the top rails 30 and 40 is minimized and uncomplicated.

Thus, the fixed door panel 14 is provided with an elongated sealing member 88 at the top rail 30 having the cross section shown best in FIG. 3. The sealing member 88 performs the dual function of providing structural integrity at the top of the fixed door panel 14 between the head 20 and the top rail 30 and seals the top of the fixed door panel. As shown, the sealing member 88 has a generally S-shaped cross section configuration, one portion of which fits over the top of one side portion of the top rail 30 and the other portion of which fits over the bottom of the head fin 80.

An identical sealing member 90 is provided at the bottom rail of the fixed door panel 14 and as shown best in FIG. 3 includes a portion fitting over one side portion of the bottom of the bottom rail 32 of the fixed door panel 14 and another portion fitting over the rib 92 on the frame sill 26. Again, the sealing member 90 provides structural integrity between the frame 12 and fixed door panel 14 at the same time that it provides a seal for the window structure 10.

Figures 4, 5:
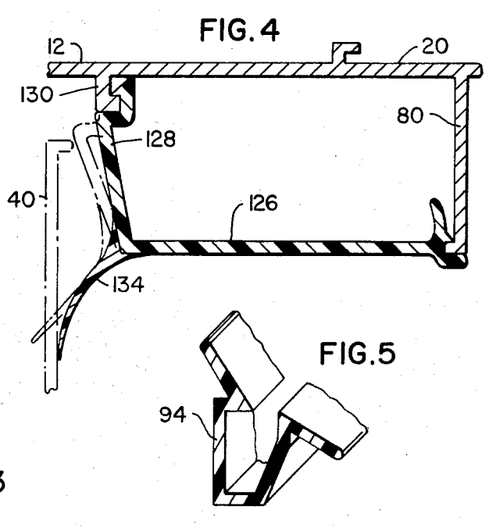
FIG. 4 is an enlarged partial section view of the door structure illustrated in FIG. 1, taken substantially on the line 4—4 in FIG. 1.
FIG. 5 is an enlarged perspective view of a portion of an alternate sealing member for use between the bottom rail of the fixed door panel and the frame sill of the sliding door structure illustrated in FIG. 1.

Alternatively, the sealing member 94 illustrated best in FIG. 5 may be used in place of the sealing member 90. When the sealing member 94 is used, the structural integrity of the fixed door panel 14 at the bottom is provided primarily by the weight of the door panel 14 resting on the sill 26 between the ribs 92 and 96. The member 94 functions primarily as a weather seal.

The sealing of the fixed door panel 14 between the fixed side rail 36 and the frame jamb 24 is accomplished by means of a flexible strip 98 which may be of vinyl or the like in contact with the fin 100 of the frame jamb 24 as shown best in FIG. 2. In addition, the structural integrity of the side rail 36 with the jamb 24 is maintained by the staked-out portions 102 of the side rail 36 fitting behind the returned end portion of the fin 104 of the jamb 24. If desired, the side rail 36 may be secured to the jamb 24 by separate screws, clips or the like in keeping with present conventional construction.

In assembly, the sealing members 88 and 90 or 94 are positioned on the fixed door panel 14 and the door panel 14 is positioned in the frame 12 by first placing the fin 80 in the seal 88 and pivoting the fixed door panel 14 inwardly of the frame 12 at the bottom while moving the fixed door panel 14 upward so that the bottom rail 32 clears the rail 70 and rib 92. When the door panel 14 is thus positioned vertically in the frame 12, the door panel 14 is allowed to drop slightly to position the seal 90 or 94 over the rib 92.

The fixed door panel 14 is then moved toward the frame jamb 24 to cam the taked-out portions 102 of the side rail 36 of the fixed door panel 14 into the jamb pocket 106, whereby the sealing felt 98 is positioned in contact with the fin 100 of the jamb 24 and the fixed rail 36 is locked in assembly with the jamb 24. Removal of the fixed door panel 14 then requires the placing of a screwdriver or the like between the fin 104 and rail 36 to spring the fin 104 and permit the staked-out portions 102 of the rail 36 to be removed from the jamb 24. Such removal of the fixed door panel can only be accomplished from the inside of the door.

The fixed door panel 14 and the movable door panel 16 are sealed at the interlocking portions of the free side rails thereof by the flexible strips 108 and 110 positioned in the side rails 34 and 46 as shown best in FIG. 2. Similarly, the locking side rail 44 of the movable door panel is sealed in the pocket 112 of frame jamb 22 with the movable door panel 16 in a closed position by the flexible strip 114. Strips 108, 110 and 114 may be vinyl or similar material. As shown, a suitable handle 116 and lock structure 118 are also secured to the locking side rail 44 of the movable door panel 16 and the frame jamb 22.

The bottom of the movable door panel 16 is sealed by a sealing member 122 having a cross section illustrated best in FIG. 3 and extending from the side of the movable door panel expander 124, which will be considered subsequently. It will be noted that the sealing member 122 extends toward the outside side of the sliding door structure 10 whereby wind pressure on the door structure 10 increases the seal provided by the sealing member 122.

The top rail 40 of the movable door panel 16 is provided with a weather seal by the dual durometer sealing member 126, the cross section of which is shown best in FIG. 4. The portion 128 of the sealing member 126 is of relatively rigid plastic which is flexible enough to be snapped in place over the rib 130 on the head 20 of the frame 12, with the opposite end thereof being constructed to cam over and receive the end of the fin 80 of the head 20. Thus, the sealing member 126 may be positioned within the pocket 84 in the head 20 of the frame 12. With the sealing member 126 so positioned, the softer, more pliable portion 134 of the sealing member wipes against the upper rail 40 of the movable door panel 16 to provide a seal therefor.

Thus, both the fixed door panel 14 and the movable door panel 16 are completely sealed around their entire periphery when the movable door panel is closed, with a minimum number of simple sealing members. In addition, the sealing system does not orient any of the frame or door panel members so that they are again as universal as possible whereby the sliding door structure of the invention may be produced with a minimum inventory. At the same time, due to the single guiding fin provided in the head member 20 and the deletion of a separating fin between the fixed and movable door panels in the head 20, and the unique sealing members 88, 92 or 94, 122 and 126 provided, a more efficient and less expensive sealing system for the sliding door structure 10 than has been available in the past is provided.

Figure 6:
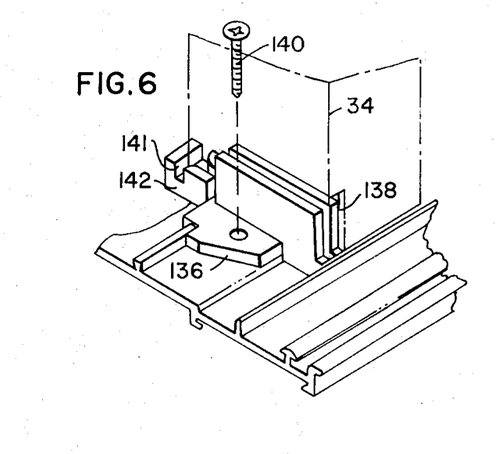
FIG. 6 is an enlarged perspective view of a portion of the frame sill of the sliding door structure illustrated in FIG. 1 including a weather stop in assembly therewith and showing the free side rail of the fixed door panel of the sliding door structure in assembly therewith in phantom.

Should the sliding door structure 10 be installed in areas where extremely high winds of for example hurricane velocity may be expected, a weather stop bracket 136, shaped as shown best in FIG. 6, is provided at the bottom of the free rail of the fixed door panel 14. In installation, the open end of the fixed door panel free side rails 34 is positioned over the rectangular portion 138 of the bracket 136 and positioned within the grooves 141 in the part 142 of bracket 136. A screw 140 is used to secure the bracket 136 to the sill 36.

In addition to the weather stop 136, the side rail 36 may, if considered necessary, be secured by a screw centrally thereof to the fin 100 of jamb 24, and the top rail 30 may be secured by a screw to the fin 80 of the head 20 adjacent the free side rail 34. With such additional structure, the sliding door structure 10 can withstand extremely high winds of hurricane velocity.

Figure 7:
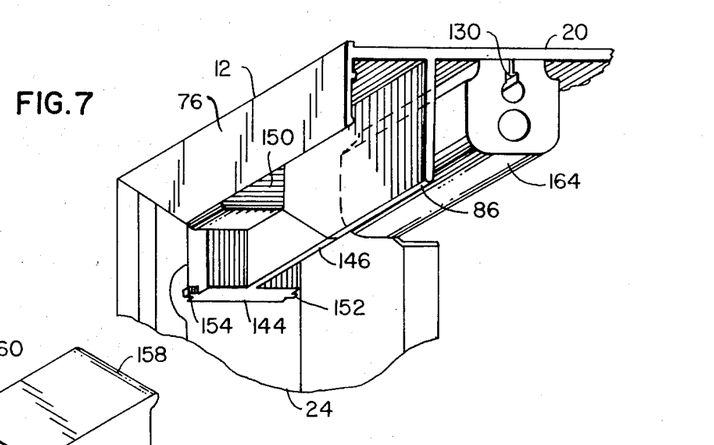
FIG. 7 is an enlarged partial perspective view of one upper corner of the sliding door structure illustrated in FIG. 1, illustrating a flexible bumper for the movable door panel, and a weather stop and prowler security member installed at the head of the sliding door frame.

As shown best in FIG. 7, the upper corners of the sliding door structure 10 are provided with a weather stop and prowler security member 144. The member 144, which is shown in perspective in FIG. 8, includes the triangular fin portion 146 adapted to complete the guide fin 86 of the head 20. The fin 146 is necessary due to the mitered corner and the provision of the fin 86 on the head 20 without a similar fin on the jamb members 22 and 24.

In addition, the member 144 is provided with the rectangular portions 148 and 150 which extend across the pocket 112 in the jamb 22. The member 144 is spaced in the pocket 112 by the projections 152 and 154 thereon. The flanges 156 and 158 aid in retaining the member 144 in position at the top of the jamb members 22 and 24 with the upper portion of the fin 86 in the slot 160 between the portions 148 and 150. When installed on the head 20, member 144 also serves to align the mitered upper corners of frame 12 in field assembly of the frame.

In use, the member 144 also serves to prevent upward jiggling of the movable door panel 16 and consequent unlocking of the latching mechanism by prowlers or the like. Thus, with the movable door panel 16 closed, the top of the locking side rail 44 will engage the bottom side of the portions 148 and 150 to prevent undesired upward movement thereof.

A similar function may be accomplished by cut-out and folded-down rectangular portions in the head 20 of the frame 12. Such cut-out and folded-down portions may be provided anywhere along the length of the head 20 where they are desired, but will most usually be spaced out across the opening provided in the sliding door structure 10 by the open movable door panel.

Bumpers 164 as shown best in FIG. 7 are provided at the top and bottom of jamb 24 to prevent damage to the movable door panel 16, rollers secured thereto and-/or the frame 12 due to rapid opening of the movable panel 16 and/or cocking of the movable door panel 16 on engagement with a single bumper 164 at either the head or sill of the frame 12 or at the middle of the frame 12. Thus, separate stop members 164 are positioned both on the rib 130 of the head and on the rail 166 of the sill so that they engage the free rail 46 of the movable door panel 16 as the door panel approaches a fully open position. The bumpers 164 have the cross section illustrated in FIGS. 7 and are provided with a slot 166 so that no fabrication of the head 20 or sill 26 is necessary to install the bumpers 164.

Figure 9:
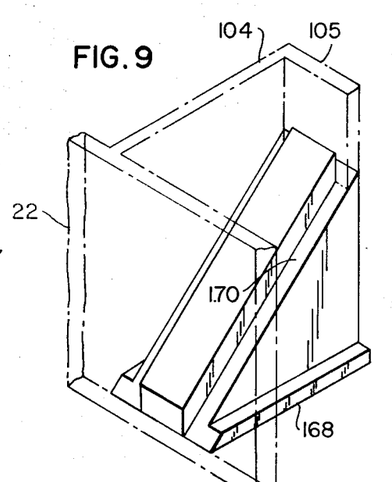
FIG. 9 is an enlarged perspective view of a weather stop member also used for aligning the bottom of the mitered jambs of the outer frame illustrated in assembly with the lower end of a frame jamb which is shown in phantom.
Figure 13:
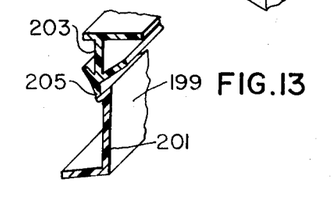
FIG. 13 is an enlarged partial perspective view of another embodiment of the dual durometer single extrusion modification of the two glazing members illustrated in FIG. 10.

The triangular member 168 is provided at the bottom of the frame jambs 22 and 24 to close the bottom of the mitered jambs at the jamb fins 104. Fins 104 include the portion 105 which wraps around the top of a member 168 and fits within the offset 170 in the top of the triangular member 168 as shown in FIG. 9. Before being inserted in the ends of the fins 104 at the bottoms of the jamb members 22 and 24, the triangular members 168 may be secured in position on sill 26 by means of screws or the like, whereby the members 168 align the bottom mitered corners of the frame 12 in field assembly.

The glazing members 174 illustrated in FIGS. 1–3 can withstand high wind loads on the glazing panels 14 and 16. However, such channel type glazing is expensive and requires that the panels be removed and disassembled for reglazing. Therefore, since interior glazing of sliding doors is desirable, as for example in apartment buildings and the like, door panel top, bottom and side rails having a glazing cross section configuration such as that illustrated in FIG. 10 including the recess 176 are provided. Such rais in conjunction with the glazing members 180 and 182 or 184 illustrated in FIGS. 10 and 11 provide a very high wind resistant glazing system which may be installed from the inside of the sliding door and will accommodate substantially the full range of glazing panel thicknesses from thin, single strength to thicker insulating glazing panels at a moderate cost.

Figures 8, 10, 11, 12:
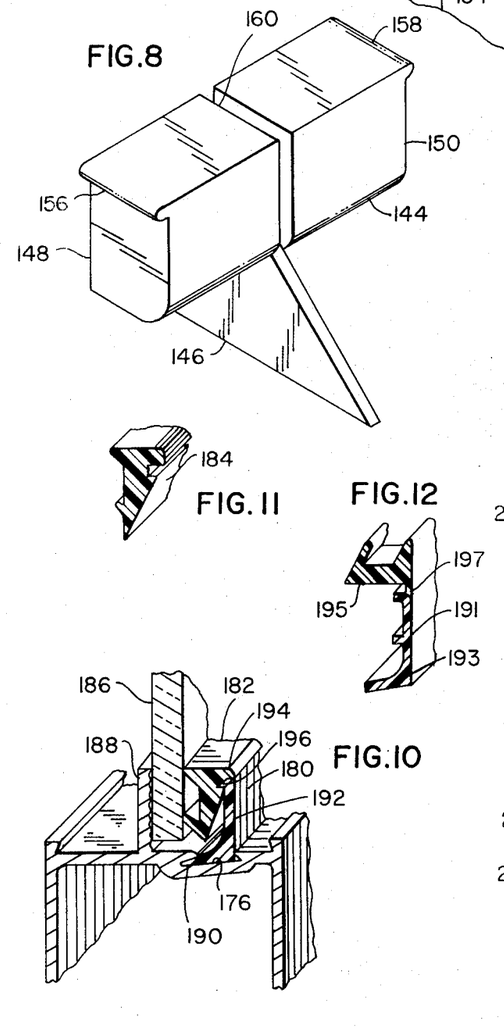
FIG. 8 is an enlarged perspective view of the weather stop and prowler security member shown in FIG. 7.
FIG. 10 is an enlarged partial perspective view of a two-member glazing system for use in sliding door structure such as that illustrated in FIG. 1.
FIG. 11 is an enlarged partial perspective view of one of the two glazing members illustrated in FIG. 10 showing an alternative cross section therefor.
FIG. 12 is an enlarged partial perspective view of a dual durometer single extrusion modification of the two glazing members illustrated in FIG. 10.

With the glazing system illustrated in FIG. 10, a glazing panel such as panel 186 is positioned in the door panel opening against the glazing flange 188. The glazing member 180 having the L-shaped cross section having the leg 190 and the leg 192 is positioned in the recess 176 with the leg 190 as shown within the recess. A glazing member 182 or 184, depending on the thickness of the glazing panel 186, is inserted between the glazing panel 186 and the portion 192 of the glazing member 180 with the projection 194 on the member 180 extending within the recess 196 in the member 182 or 184.

The modified glazing member 191 is a dual durometer member having a relatively hard portion 193 similar to the L-shaped glazing member 180 and a relatively soft portion 195 similar to the glazing member 182. The portions 193 and 195 of the glazing member 191 are connected by the relatively soft, flexible portion 197. In installation the L-shaped portion 193 of the glazing member 191 is installed in the recess 176 in the rails of a door panel 14 or 16 and the member 195 is rotated counterclockwise into the position shown for glazing member 182 in FIG. 10. The advantage of the dual durometer glazing member 191 is a saving in extrusion time, since only one extrusion need be made, and in cutting and assembly time, since only one glazing member 191 need be cut to length and handled.

The modified dual durometer glazing strip 199 is illustrated in FIG. 3 having a relatively hard, L-shaped portion 201 and the relatively soft portion 203 connected by a frangible portion 205. In assembly of the glazing member 199, the L-shaped portion is positioned in recess 176 and the portion 203 is forced between the L-shaped portion 201 and the glazing panel 186.

With the sliding door structure 10, it is often desirable to double lock the movable door panel 16 or open it a few inches to provide ventilation and still maintain the movable door panel 16 locked to prevent entry of prowlers or the like or to prevent small children from going out of the sliding door. As indicated above, in the past such locks have not been provided on sliding door structure or have either been too complicated or not sufficiently sophisticated. Thus, in the past a length of pipe which may be inserted between the jamb 24 and the free rail 46 of the movable door panel 16 has been used to prevent opening of the movable door member more than a predetermined amount.

Figures 14, 15, 16, 17, 18, 19:
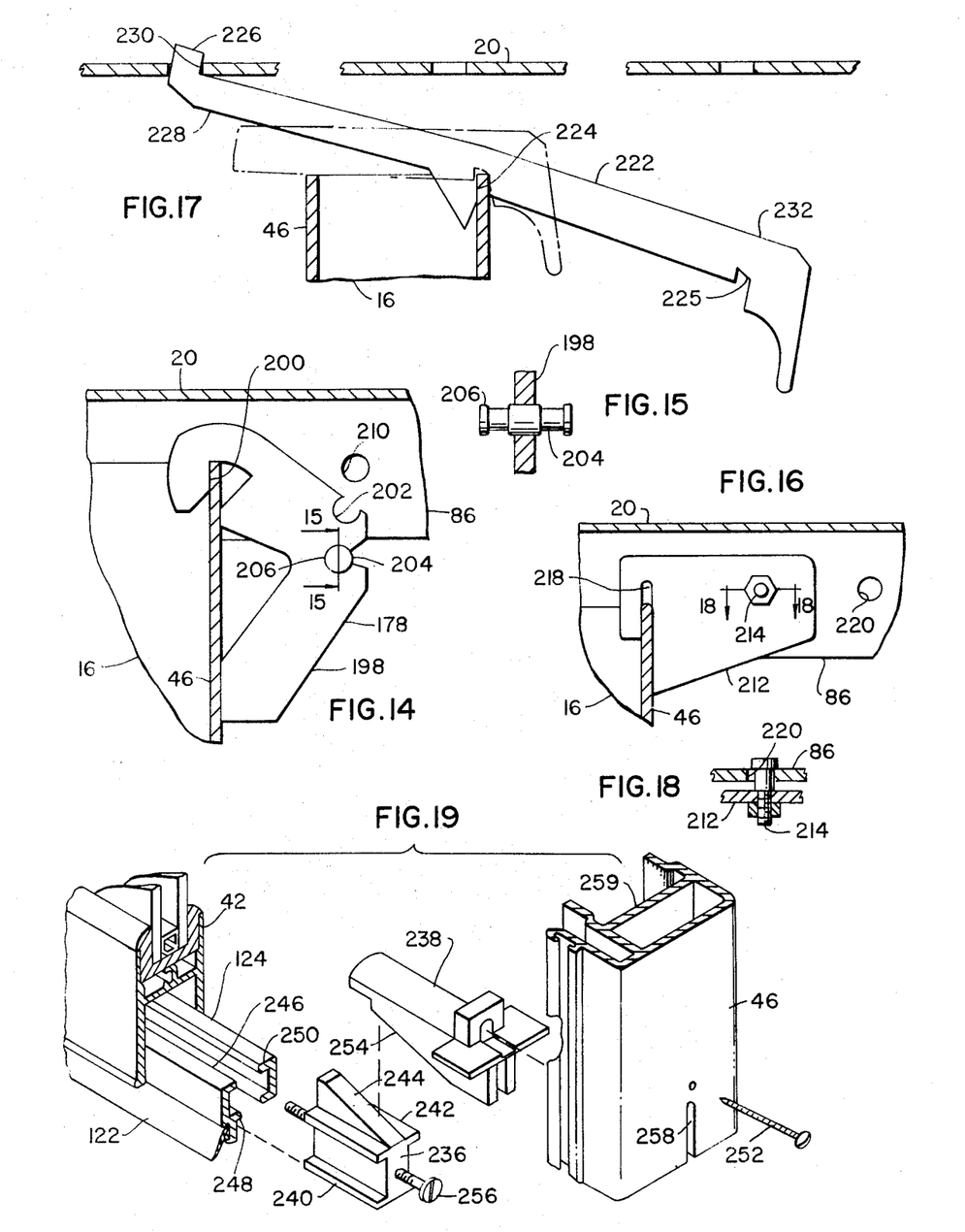
FIG. 14 is an enlarged elevation view of prowler lock structure for use in the sliding door structure illustrated in FIG. 1.
FIG. 15 is a partial section view of the prowler lock structure illustrated in FIG. 14, taken on the line 15—15 in FIG. 14.
FIGS. 16 and 17 are enlarged elevation views of modified prowler lock structures for use with the sliding door structure illustrated in FIG. 1.
FIG. 18 is a partial section view of the prowler lock structure illustrated in FIG. 16, taken on the line 18—18 in FIG. 16.
FIG. 19 is an enlarged, exploded perspective view of the structure for use in adjusting the movable door panel of the sliding door structure illustrated in FIG. 1 to compensate for out-of-square building openings including a perspective view of a wedge adapted to fit into the expander inserted in the movable door panel bottom rail and a perspective view of a wedge block adapted to fit into a frame rail of the movable door panel in engagement with the wedge.

In accordance with the present invention, a prowler lock structure 178 is provided as shown in FIG. 14 which includes a generally V-shaped member 198 having a notch 200 at the end of one leg thereof, a template opening 202 adjacent the apex thereof and an opening in the apex thereof in which a stud 204 is secured extending on both sides of the member 198. The stud 204 has enlarged headed portions 206 on the ends thereof. The prowler lock structure 178 has the elevation configuration illustrated in FIG. 14 and is substantially flat except for the stud 204 extending therethrough as shown in FIG. 15.

On installation, the prowler lock member 198 is positioned with the top of one side of the movable door panel free side rail 46 received in the notch 200. The notch 200 and the relative dimensions of the prowler lock member 198 together with the positioning of the movable door side rail 46 in relation to the head 20 of the frame 12 is such that after installation, the prowler lock member 198 cannot be removed from the side rail 46 without adjusting the movable door panel 16 to its lowermost position.

After installation of the prowler lock member 198 on the side rail 46, the prowler lock member 198 is pivoted counterclockwise about the top of the rail portion 46 within the notch 200 until the stud 204 on the prowler lock member 198 engages the fin 86 of the head 20, at which time an opening is drilled through the template opening 202 and the adjacent fin 86 of the head 20. Such holes are drilled wherever it is desired to lock the movable door panel 16.

In operation then, with the holes 210 drilled in the fin 86 and with the prowler lock member 198 positioned as indicated in FIG. 14, the movable door panel 16 may be completely opened and closed with the prowler lock member 198 serving no function. When it is desired to lock the movable door panel 16 in a position at which there is an opening 210, the prowler lock member 198 is pivoted counterclockwise so that the stud 204 aligns with the desired opening 210, after which the prowler lock member 198 is moved outwardly of the sliding door structure to engage one end of the stud 204 in the opening 210. The other end of the stud 204 may be used as a handle in accomplishing the alignment and movement of the prowler lock member 198. On release of the prowler lock member 198, the head portion 206 of the end of the stud 204 within the opening 210 will prevent accidental removal of the stud from the opening 210 and provide a positive lock of the sliding door panel 16 in the selected position.

In the modified prowler lock structure illustrated in FIG. 16, the prowler lock member 212 has a side elevation as shown and again is generally flat except for a stud 214 extending transversely therethrough, which stud may have a head on the side adjacent the flange 86 and may have a nut which would serve as a handle on the opposite side thereof, as shown in FIG. 18.

With the prowler lock structure illustrated in FIGS. 16 and 18, again the prowler lock member 212 is positioned over the end of the side rail 46 by means of the slot 218 in which position the prowler lock member 212 may be moved up or down, as desired. Again, an opening through the prowler lock member 212 (not shown) may be used as a template for drilling holes 220 in the flange 86 at the locations where locking is required. With the prowler lock member 212 in a raised position, the stud 214 is then assembled with the prowler lock member 212.

In operation, with the prowler lock member 212 in a down position, the prowler lock structure is not operative. When it is desired to lock the movable door panel 16 in an open position, the movable door panel is moved to the position desired, the prowler lock member 212 is moved up and the stud 214 is aligned with an opening drilled in the fin 86, after which the prowler lock member is moved toward the fin 86 to insert the stud through the opening and provide a positive lock for the movable door panel 16.

A third prowler lock structure suitable for use with the sliding door structure 10 and illustrated in FIG. 17 includes the prowler lock lever 222 including the notch 224 therein adapted to receive the upper end of the rail 46. Lever 222 further has a projection 226 on the end 228 thereof adapted to fit within openings 230 provided in the head 20. The end 232 of the prowler lock lever 222 is weighted to bias the projection 226 into engagement with the head 20. A further notch 225 is provided in lever 222 which is also adapted to fit over the top of rail 46 and thus retain the lever 222 in a stored position with the end 226 not biased into engagement with the head 20 as shown in phantom in FIG. 17.

Thus, in operation of the prowler lock structure illustrated in FIG. 17, with the top of rail 46 within notch 225 in lever 222, the movable door panel 16 may be moved to any desired location. With the top of rail 46 in the notch 224 in lever 222, the projection 226 of the lever 222 will be biased into the first opening 230 in the head that it comes to on sliding of the movable door panel 16 in either direction to positively lock the movable door panel in a desired position.

With the larger size sliding doors today, it is unusual to find a building opening provided for a door which is exactly square. Thus, adjustment of the movable door panel 16 is normally required to provide a desired fit in the frame 12, the members of which are secured in the building opening and therefore to some extent follow the irregularities of the building opening.

The structure shown in FIG. 19 provides for adjustment of the moving door panel 16 by pivoting the moving door panel about the bottom thereof on vertical adjustment of the free rail 46 side thereof. The adjustment of the movable door panel 16 is accomplished through the use of the expander 124, a wedge 236 adapted to fit within the expander 124, and a wedge block 238 secured within the side and bottom rails 46 and 42 of the door panel 16 in engagement with the wedge 236. In operation, the wedge 236 and wedge block 238 provide an adjustment great enough so that the adjustment of only one side of the movable door panel 16 is required.

As shown, the wedge having the flanges 240 and 242 thereon fits within the expander 124 with the inclined plane portion 244 extending through the slot 246 therein and with the flanges 240 and 242 resting underneath and on top of the ribs 248 and 250 in the expander 124, respectively. The wedge block 238, shaped as shown best in FIG. 19, is secured to the side rail 46 by the screw 252 and extends within the bottom rail 42 with the inclined plane surface 254 in engagement with the inclined plane surface 244. The adjusting screw 256 extends through the slot 258 in the side rail 46 of the movable door panel 16.

Thus in operation, on adjustment of the position of the wedge 236 longitudinally in the expander 124, the side rail 46 of the movable door panel 16 is adjusted vertically to pivot the door panel 16 in the plane thereof about the bottom thereof. The movable door panel 16 is thus adjusted relative to the expander 124 which carries the rollers 260 for the movable door panel 16 and carries the weather strip member 122 on the side thereof. The movable door panel 16 is thus adjusted to meet any out-of-squareness of the frame 20 without disturbing the rollers or the weather seal at the bottom of the door.

In addition, the use of the expander permits exchange of the movable door panel 16 end for end to provide right and left hand operation by simply removing the expander 124 and the wedge block 238 and placing them in the other end of the movable door panel 16. It will also be noted that the adjustment of the door panel 16 is accomplished with a minimum number of parts in the simplest manner without disturbing the weathertightness or structural integrity of the movable door panel while preserving the lack of specific orientation of the movable door panel.

To provide a three-step coarse vertical adjustment for the movable door panel 16, the wedge 236 may be positioned with the flanges 240 or 242 on top of ribs 248 or with flanges 242 on top of ribs 250. Additional coarse adjustment could be provided by adding intermediate flanges between flanges 248 and 250. In any position of the wedge 236, fine adjustment of the edge of the door is accomplished on movement of the wedge block 238 horizontally with respect to the wedge with the inclined plane portions 254 and 244 thereof in surface to surface engagement.

Adjustment of the other edge of the movable door panel 16 is possible with wedges and wedge blocks at both ends of expander 124. Alternatively, the web 259 of rail 46 may be offset toward wedge 240 and used in place of wedge block 238 in conjunction with wedge 240 to provide adjustment of the edges of the movable door panel 16.

Figures 20, 21, 22:
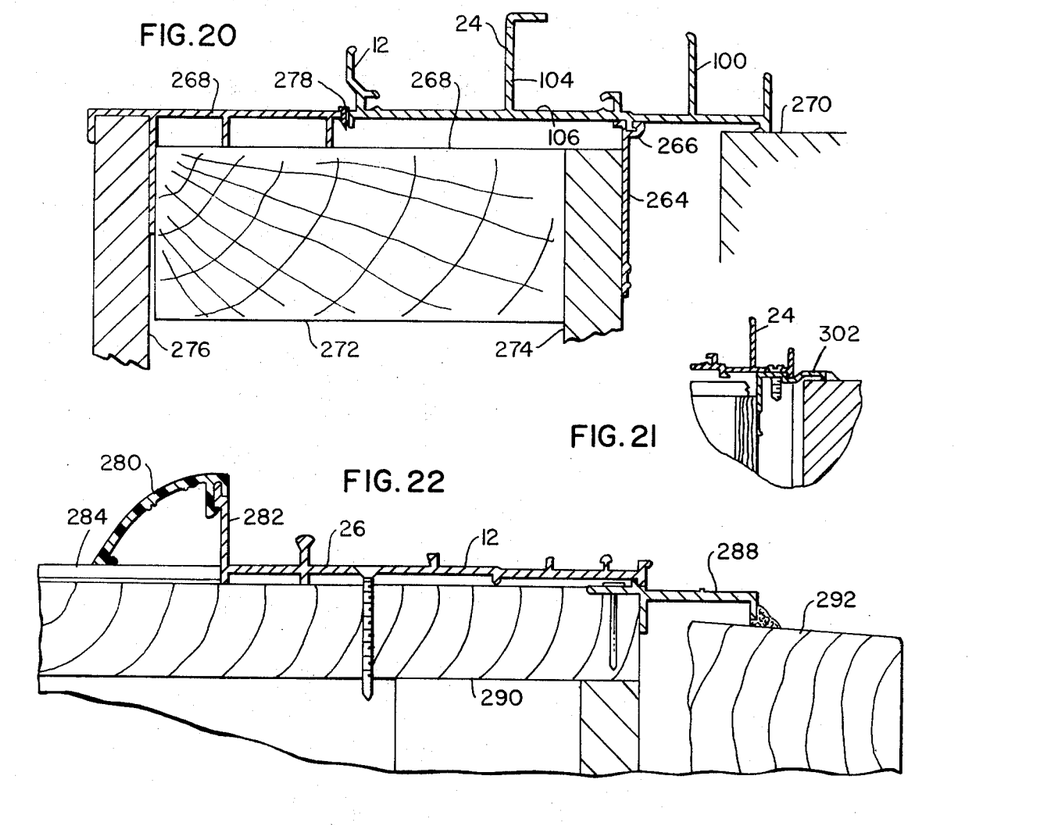
FIG. 20 is an enlarged section view of a jamb of the outer frame of the sliding door structure illustrated in FIG. 1 showing a nailing fin adapter and an inside trim extrusion in assembly therewith.
FIG. 21 is a reduced portion of FIG. 20 showing a modified nailing strip between the frame jamb and brick exterior construction.
FIG. 22 is an enlarged section view of the sill extrusion of the sliding door structure frame illustrated in FIG. 1 showing a sill extender extrusion in assembly therewith and illustrating a flexible bullnose interior molding in assembly therewith.

As shown best in FIG. 20, the frame 12 may be secured in a building opening 262 by means of nails passed through nailing strip adapters 264 interlocked with a rib 266 on the frame members where direct connection of the frame members such as the jamb 24 in the building opening is not desired. The nailing strip member 264 has the cross section as illustrated in FIG. 16 and may be in the form of short brackets or if desired, longer nailing strip members interlocked with the rib 266. Alternate nailing strips 302 particularly suitable for use with brick construction may have the configuration shown in FIG. 21.

Further, the interior trim of the building opening 262 may be facilitated with a trim extrusion 268 having the cross section illustrated in FIG. 20. While other building constructions are possible, in FIG. 20 brick facing 270, interior stud 272, exterior wall 274 and interior wall 276 are illustrated. The joint between the frame jamb 24 and the interior trim extrusion 268 is closed as shown by a closure strip 278 having substantially the same configuration as the glazing member illustrated in FIG. 11.

Also, the interior trim of the building opening in which the sliding door structure is secured may be facilitated at the sill by means of the plastic bullnose extrusion 280 having the cross section shown in FIG. 22 and adapted to fit between the sill fin 282 and the interior flooring 284. The bullnose extrusion 280 is flexible to permit varying dimensions of flooring in conjunction with the sill 26.

Figure 23:
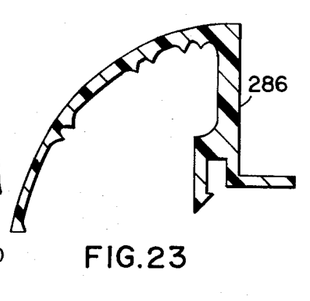
FIG. 23 is a section view of a modified flexible bullnose interior trim extrusion for use with the door structure illustrated in FIG. 1.

A modification of the bullnose member 280 is shown in FIG. 23 to accommodate thicker flooring such as carpeting as may be desired or to accommodate a lower fin 282 on the sill 26. To this end, the extension 286 is provided on the bullnose interior trim member illustrated in FIG. 23.

Further, the sill 26 may be extended by means of the adapter extrusion 288 having the cross section illustrated in FIG. 22 and shown in conjunction with wood sub-flooring and masonry exterior building members 290 and 292.

Figure 24:
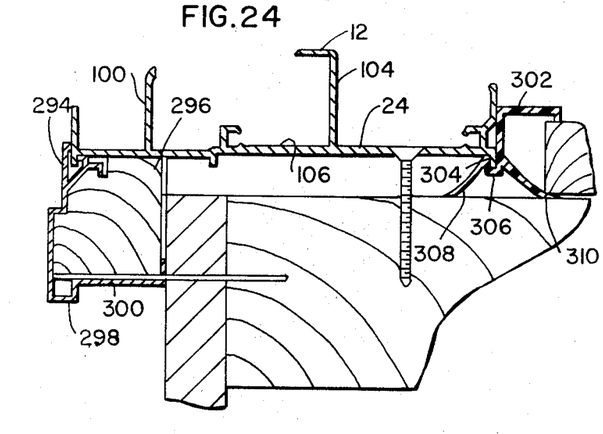
FIG. 24 is another enlarged section view of a jamb of the outer frame of the sliding door structure illustrated in FIG. 1, showing an exterior trim member in assembly therewith including a soft core having an extruded tougher skin thereon, and showing another embodiment of an inside trim extrusion in assembly therewith.

The exterior trim member 294 illustrated in FIG. 24 is unique in that it includes a relatively soft wood core 296 and an extruded shell 298 of relatively harder and-/or more weather resistant material adapted to interlock with the frame 12 as shown in conjunction with the frame jamb 24. The trim member 294 may be secured to the usual exterior wood building wall by convenient means such as nail 300 or the like.

Interior trim may also assume the configuration of extrusion 302 having the cross section shown in FIG. 24 including the pocket 304 for receiving the end 306 of jamb 24 and the flexible leg portions 308 and 310. Assembly of the interior trim strip 302 is as shown in FIG. 24.

While one embodiment of the present invention has been disclosed in detail and modifications suggested, it will be understood that other embodiments and modifications of the invention are contemplated. It is the intention to include all embodiments and modifications as are defined by the appended claims within the scope of the invention.

What I claim as my invention is:

1. Sliding door structure comprising an outer frame having two upper and two lower mitered corners, jambs with a returned fin thereon, a sill and a head with a single door panel guiding fin and at least two additional fins extending inwardly of the frame in spaced relation to the guiding fin on opposite sides thereof, at least one movable door panel in assembly with the outer frame including a top rail in engagement with one of the additional fins and having a slot in the top thereof receiving the guiding fin and at least one fixed door panel positioned between the other additional fin and the movable door panel in assembly with the frame and movable door panel, and weather strip means positioned about the periphery of each of the door panels in assembly in the frame and with the movable door panels in a closed position, and combined weather stops and miter aligning members secured between the sill and jambs at the lower corners of the frame.

2. Structure as set forth in claim 1, wherein the combined weather stops and miter aligning members are generally triangular and include a peripheral recess in the top thereof adapted to receive the returned fins on the jambs.

3. Sliding door structure comprising an outer frame having a head with at least one door panel guiding fin extending inwardly of the frame and jambs, at least one movable door panel in assembly with the outer frame having a slot in the top thereof receiving the guiding fin and a combined weather stop miter aligning and prowler security member positioned at each upper corner of the outer frame for closing the area between mitered ends of the head of the frame and the jambs of the frame, aligning the ends of the head and jamb during field mitering and preventing upward movement of the movable door panel with the movable door panel in a fully closed position at one side of the frame.

4. Sliding door structure comprising an outer frame having two upper and two lower mitered corners and including frame jambs and a frame head with a single door panel guiding fin and one additional fin extending inwardly of the frame in spaced relation to the guiding fin, at least one movable door panel in assembly with the outer frame having a slot in the top thereof receiving the guiding fin and at least one fixed door panel positioned between the additional fin and the movable door panel in assembly with the frame and movable door panel, weather strip means positioned about the periphery of each of the door panels in assembly with the frame with the movable door panel in a closed position and a combined weather stop miter aligning and prowler security member positioned at each upper corner of the outer frame for closing the area between the mitered ends of the head of the frame and the jambs of the frame, aligning the head and jambs for field assembly of the upper corners of the frame and for preventing upward movement of the movable door panel with the movable door panel in a fully closed position.

5. Structure as set forth in claim 4, wherein the combined weather stop, miter aligning and prowler security member comprises a triangular fin having a pair of generally rectangular portions secured to one acute corner thereof and providing a triangular slot between the rectangular portions for receiving a portion of the guiding fin of the frame head.

6. Sliding door structure comprising an outer frame having two upper corners and including frame jambs and a frame head with a single door panel guiding fin and one additional fin extending inwardly of the frame in spaced relation to the guiding fin, at least one movable door panel in assembly with the outer frame having a slot in the top thereof receiving the guiding fin and at least one fixed door panel positioned between the additional fin and the movable door panel in assembly with the frame and movable door panel, weather strip means positioned about the periphery of each of the door panels in assembly with the frame with the movable door panel in a closed position and a combined weather stop miter aligning and prowler security member positioned at each upper corner of the outer frame for closing the area between the mitered ends of the head of the frame and the jambs of the frame, aligning the head and jambs for field assembly of the upper corners of the frame and for preventing upward movement of the movable door panel with the movable door panel in a fully closed position.

7. Sliding door structure comprising an outer frame having jambs and a head including a cross section with a substantially flat base portion, a guiding fin extending inwardly of the frame from the base portion and adjacent one end thereof, two additional fins extending inwardly of the frame from the base portion on opposite sides of the guiding fin one of which depends from the end of the base portion and a rib extending from the base portion inwardly of the frame between the guiding fin and other additional fin, at least one movable door panel in assembly with the outer frame including a top rail having a U-shaped cross section, one leg of which is in engagement with the one additional fin and which top rail has slots in the ends thereof receiving the guiding fin, at least one fixed door panel positioned between the other additional fin and the movable door panel in assembly with the frame and movable door panel also having a top rail with a U-shaped cross section, and weather strip means positioned about the periphery of each of the door panels in assembly with the frame with the movable door panel in a closed position including a plastic strip between one frame jamb and the fixed door panel having an L-shaped cross section portion the ends of which engage the rib on the head of the frame and the inner end of the other additional fin and a sealing portion extending from the inner section of the legs of the L-shaped cross section portion of the sealing member into engagement with the top rail of the movable door panel in a closed position.

8. Structure as set forth in claim 7 wherein the plastic strip is a dual durometer member wherein the L-shaped cross section portion is harder than the sealing portion.

9. Structure as set forth in claim 8 wherein the weather strip means between the top of the fixed door panel and the head of the frame includes a plastic sealing member having an S-shaped cross section one portion of which extends over the edge of one leg of the U-shaped cross section of the fixed door panel top rail and one portion of which fits over the edge of the other additional fin on the head of the frame.

10. Structure as set forth in claim 9 wherein the door panels include side rails and the weather strip means includes interlocking portions on the adjacent side rails of the fixed and movable door panels with the movable door panel in a closed position.

* * * * *